(12) United States Patent
Mittal et al.

(10) Patent No.: US 12,129,009 B2
(45) Date of Patent: Oct. 29, 2024

(54) FLETTNER ROTOR WITH LOCALIZED SUCTION

(71) Applicant: THE JOHNS HOPKINS UNIVERSITY, Baltimore, MD (US)

(72) Inventors: Rajat Mittal, Vienna, VA (US); Jung Hee Seo, Baltimore, MD (US); Christopher Williams, Wakefield, MA (US); Rui Ni, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 17/922,575

(22) PCT Filed: Apr. 30, 2021

(86) PCT No.: PCT/US2021/030283
§ 371 (c)(1),
(2) Date: Oct. 31, 2022

(87) PCT Pub. No.: WO2021/222819
PCT Pub. Date: Nov. 4, 2021

(65) Prior Publication Data
US 2023/0174208 A1 Jun. 8, 2023

Related U.S. Application Data

(60) Provisional application No. 63/017,941, filed on Apr. 30, 2020.

(51) Int. Cl.
*B63H 9/00* (2006.01)
*F03D 3/00* (2006.01)
*F03D 9/32* (2016.01)

(52) U.S. Cl.
CPC .............. *B63H 9/00* (2013.01); *F03D 3/005* (2013.01); *F03D 9/32* (2016.05);
(Continued)

(58) Field of Classification Search
CPC .. B63H 9/00; B63H 9/02; F03D 3/005; F03D 3/06; F03D 9/32; F05B 2240/931;
(Continued)

(56) References Cited

U.S. PATENT DOCUMENTS 1,674,169 A 6/1928 Flettner
2,713,392 A * 7/1955 Von Karman ........... B63H 9/02
244/209
(Continued)

FOREIGN PATENT DOCUMENTS

EP 0055638 A1 * 7/1982
EP 2202144 A1 6/2010
(Continued)

OTHER PUBLICATIONS

Cousteau et al. FR2495242 Espacenet—English Machine Translation (Year: 1982).*
(Continued)

*Primary Examiner* — Justin D Seabe
*Assistant Examiner* — Wayne A Lambert

(57) ABSTRACT

A Flettner rotor that employs localized suction over its surface improves performance and fuel efficiency. Simulations and analysis show that such a method can significantly improve the performance of the Flettner rotor. Improvements in rotor performance enable reduction in fuel costs and greenhouse gas emission by ships or other modes of transport. Improvements in rotor performance can also reduce noise for applications such as drones or other devices having rotors.

20 Claims, 25 Drawing Sheets

(52) U.S. Cl.
CPC ... *F05B 2240/201* (2013.01); *F05B 2240/931* (2013.01); *F05B 2260/02* (2013.01)

(58) Field of Classification Search
CPC ............ F05B 2260/02; F05B 2210/403; F05B 2240/201; Y02E 10/74; Y02T 70/5236
See application file for complete search history.

(56) References Cited

U.S. PATENT DOCUMENTS

| | | | |
|---|---|---|---|
| 4,630,997 A * | 12/1986 | Cousteau | B64C 21/06 416/4 |
| 9,694,889 B2 * | 7/2017 | Holohan | B63H 21/20 |
| 2002/0179777 A1 | 12/2002 | Al-Garni et al. | |
| 2009/0217851 A1 * | 9/2009 | Kind | B63H 9/02 416/4 |
| 2013/0213286 A1 | 8/2013 | Rohden | |
| 2013/0230399 A1 * | 9/2013 | Rohden | B63H 9/02 416/223 R |
| 2013/0236313 A1 * | 9/2013 | Rohden | F04D 19/00 416/174 |
| 2015/0274272 A1 * | 10/2015 | Winkler | F15D 1/12 114/39.3 |

FOREIGN PATENT DOCUMENTS

| | | | | |
|---|---|---|---|---|
| GB | 2179014 A | * | 2/1987 | |
| JP | 2005225271 A | * | 8/2005 | |
| KR | 20220051469 A | * | 4/2022 | |
| RU | 2691705 C1 | | 6/2019 | |
| WO | WO-2013104578 A1 | * | 7/2013 | ............. F03D 3/007 |
| WO | WO-2019106532 A1 | * | 6/2019 | |

OTHER PUBLICATIONS

Fujii et al. JP 2005225271—Espacenet—Aug. 25, 2005—English Machine Translation (Year: 2005).*

* cited by examiner

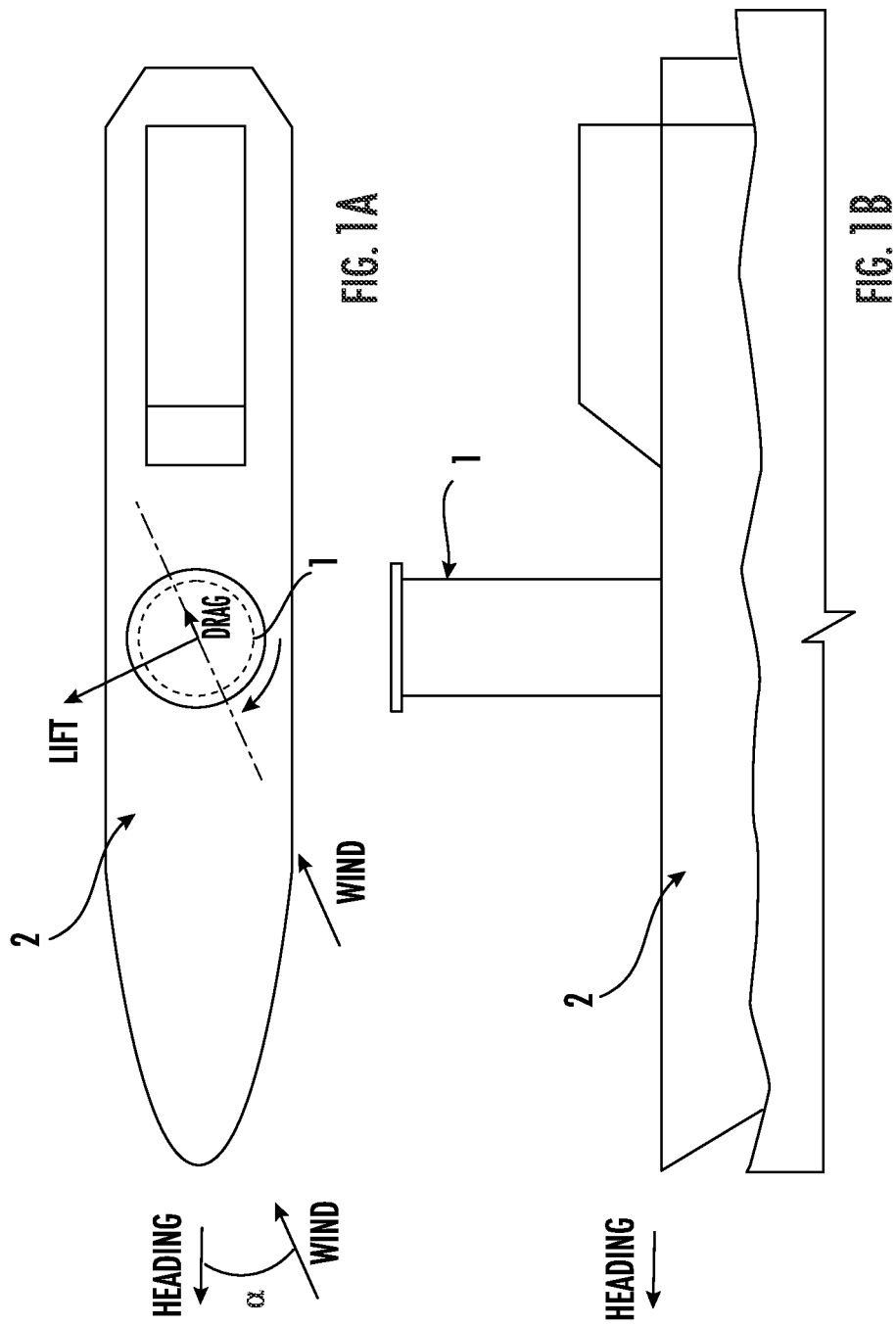

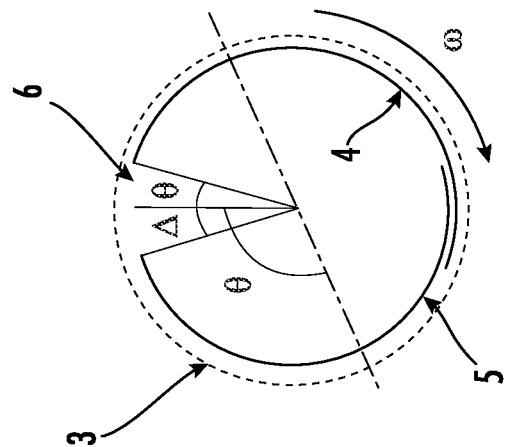
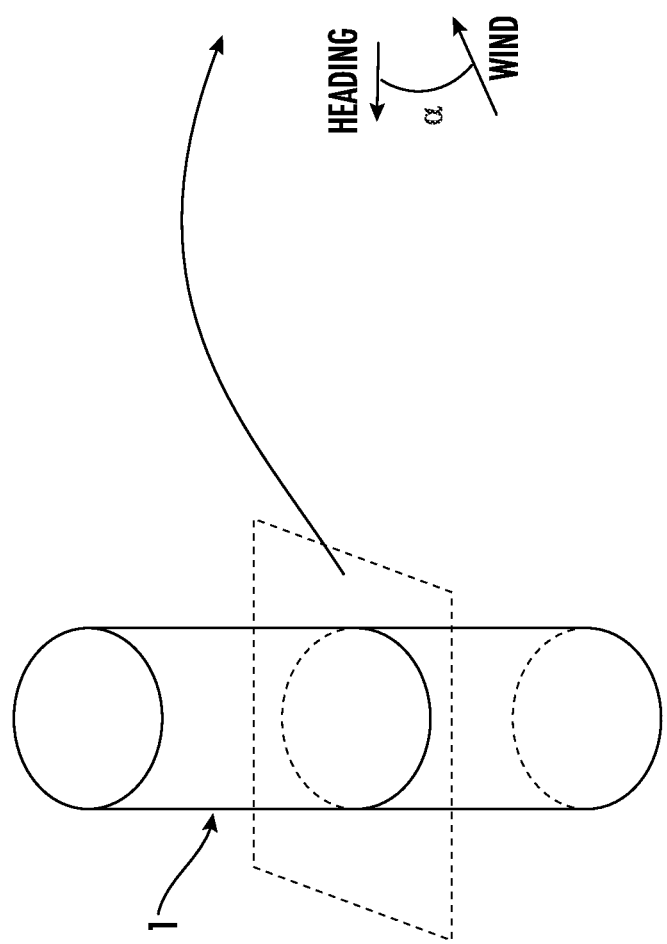
FIG. 2A
FIG. 2B

FLETTNER ROTOR WITH LOCALIZED SUCTION

CROSS-REFERENCE TO RELATED APPLICATIONS

This application is a 35 U.S.C. § 371 U.S. national entry of International Application PCT/US2021/030283, having an international filing date of Apr. 30, 2021, which claims the benefit of U.S. Provisional Application No. 63/017,941 filed Apr. 30, 2020, the content of each of the aforementioned applications is herein incorporated by reference in their entirety.

FIELD OF THE INVENTION

The present invention relates generally to rotors. More particularly the present invention relates to a Flettner rotor with localized suction.

BACKGROUND OF THE INVENTION

International shipping transports around 90% of global commerce and is of major importance for global trade and the global economy. It is unparalleled in terms of its physical capacity and ability to carry freight over long distances and at low costs. Without it, the bulk transportation of raw materials and the import and export of affordable food and goods would simply not be possible.

Fuel costs currently consume 35% of the industry's global revenue, the highest share of revenue in its history. The estimated annual fuel cost of global shipping is $100 billion.

The costs are steadily on the rise and show no signs of abating. In 2020, new regulations from the International Maritime Organization will enforce the switch to low-Sulphur fuel, which could increase the fuel costs of shipping anywhere from 25 to 60%.

Even though compared to other transportation modes, shipping is the most environmentally friendly one, the sheer magnitude of shipping operations makes the industry a major emitter of greenhouse gases (GHG). In 2007, international shipping is estimated to have emitted 870 million tons or about 2.7% of the global emissions of $CO_2$. If the shipping industry were a country, it would rank number 6 in the world $CO_2$ league table. Scenarios for future emissions of ships predict that emissions of GHG from shipping are likely to increase in the future, mainly due to an anticipated increase in demand for transport services.

Large commercial ships use bunker fuel, the tail end of the oil Refining process that emits a cocktail of gases that harm both the planet and human health. Along with $CO_2$, there are nitrogen oxides and sulfur oxides (the cause of acid rain) as well as what is known as particulate matter.

It would therefore be advantageous to provide systems and methods to reduce fuel consumption and emissions of GHG by ships. Every percent reduction in fuel usage represents a saving of $1 billion per year for the global shipping industry. Furthermore, the need for fuel reduction is prevalent in the transportation industry, and a device to reduce fuel consumption would be advantageous in a number of modes of transportation.

SUMMARY

According to a first aspect of the present invention a device for propulsion includes an outer shroud. The outer shroud has a surface defining an interior space. The surface of the outer shroud is porous to allow fluid flow through the porous surface, and the shroud is configured to rotate with an angular velocity. A circular-arc insert is disposed within the interior space of the outer shroud. The circular-arc insert is configured to rotate. A suction port is formed by adjusting the space formed by the circular-arc insert.

In accordance with an aspect of the present invention, the circular-arc insert takes the form of two circular-arc inserts. The two circular-arc inserts are configured to fit inside one another and rotate past one another. The two circular-arc inserts do not form a complete circle, and the suction port is formed by adjusting the space between the two circular-arc inserts. The circular-arc insert can take the form of N circular-arc inserts and wherein the N circular-arc inserts are configured to fit inside one another and rotate past one another. The N circular-arc inserts do not form a complete circle, and form N suction ports by adjusting the space between the N circular-arc inserts. The N ports are changeable in size and in angle. The suction port is formed at any angle θ to the incoming flow. The suction port is formed at any size Δθ. The suction flow though the porous shroud is limited through the suction port. The device can include a source of suction. The suction port can also be directed to a different angle relative to a direction of external fluid flow. The device is configured for placement on a ship, and the device is configured to use suction to provide lift to the ship.

In accordance with another aspect of the present invention, a device for propulsion includes an outer shroud having a surface defining an interior space. The surface of the outer shroud is porous to allow fluid flow through the porous surface. The shroud is configured to rotate with an angular velocity. An inverse flow manifold disposed within the interior space of the outer shroud, wherein the insert is configured to rotate to any fixed position. The device also includes a suction port wherein a location of the suction port is determined by rotation of the inverse flow manifold.

In accordance, with yet another aspect of the present invention, the inverse flow manifold is configured to be rotated to any predetermined orientation. The suction port is formed at any angle θ to the incoming flow. The suction port is formed at any size Δθ. The suction flow though the outer shroud is limited through the suction port. The device can include a source of suction. The suction port can be directed to a different angle relative to a direction of external fluid flow. The device is configured for placement on a ship, and the device is configured to use suction to provide lift to the ship.

BRIEF DESCRIPTION OF THE DRAWINGS

The accompanying drawings provide visual representations which will be used to more fully describe the representative embodiments disclosed herein and can be used by those skilled in the art to better understand them and their inherent advantages. In these drawings, like reference numerals identify corresponding elements and:

FIGS. 1A and 1B illustrate starboard and top down views of a watercraft with a Flettner rotor installed on the watercraft, according to an embodiment of the present invention.

FIGS. 2A and 2B illustrate a perspective view of a Flettner rotor, according to an embodiment of the present invention, and a sectional view of the vertical cylindrical elements of a Flettner rotor with localized suction thought a port with adjustable size and angle relative to the wind direction, according to an embodiment of the present invention.

FIG. 14A is a top-down, sectional view. FIG. 14B is a perspective view of the reverse-flow manifold with an angular input port, and FIG. 14C is a perspective view of the reverse-flow manifold installed inside a Flettner rotor.

FIGS. 15A-15C show data for cases with uniform suction over the entire surface of the Flettner rotor. The external flow is from left to right and the rotor is rotating in a clockwise direction.

FIGS. 22A and 221B illustrate graphical views of lift and drag coefficient data from computational fluid dynamics (CFD) simulations of a Flettner rotor (Ω=3) with localized suction for a range of rotational speeds (Ω) and suction velocities (γ) for suction ports with sizes of 45 degrees and 30 degrees. The external flow is from left to right and the rotor is rotating in a clockwise direction.

DETAILED DESCRIPTION OF THE PREFERRED EMBODIMENTS

Figure 3:
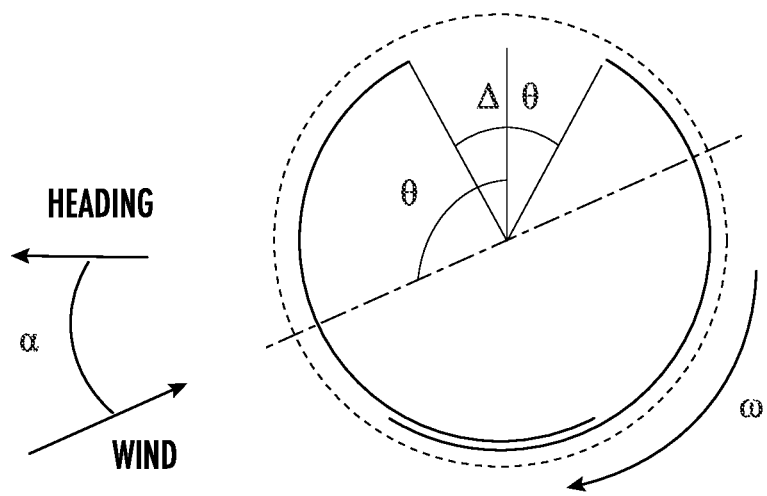
FIG. 3 illustrate a sectional view of the Flettner rotor of FIG. 2B and with a larger suction port, according to an embodiment of the present invention.

The presently disclosed subject matter now will be described more fully hereinafter with reference to the accompanying Drawings, in which some, but not all embodiments of the inventions are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated Drawings. Therefore, it is to be understood that the presently disclosed subject matter is not to be limited to the specific embodiments disclosed and that modifications and other embodiments are intended to be included within the scope of the appended claims.

The present invention is directed to a Flettner rotor that employs localized suction over its surface to improve performance. Simulations and analysis show that such a method can significantly improve the performance of the Flettner rotor. Improvements in rotor performance enable reduction in fuel costs and greenhouse gas emission by ships and other transportation or work vehicles such as airplanes, cargo trucks, farm equipment, tractor-trailers, construction equipment, or any other device that needs a rotor or means of propelling. Further, an improved rotor can also reduce sound generated, which makes the present invention well suited to applications where stealth or reduced noise is beneficial, such as watercraft, drones, and any other application known to or conceivable to one of skill in the art.

One way to cut fuel consumption and harmful emissions from shipping is by harnessing wind energy for propulsion purposes. Considering the long history of shipping, the use of fossil fuels in shipping is quite a new development. It was only in the late 18th/early 19th century that steam ships slowly started replacing sailing ships, rendering maritime transportation faster and more reliable as shipping became independent from wind conditions. Nowadays, given the looming threat of climate change, using wind energy for ship propulsion could become attractive again. For naval watercrafts, the use of Flettner rotors can reduce or even eliminate propeller noise and thereby aid in improving stealth.

There are currently three different technologies by which wind energy can be harnessed for propulsion purposes: sails, towing kites and Flettner rotors. Flettner rotors exploit the Magnus effect to generate wind propulsion. The Magnus effect dictates that a rotor in a wind stream will generate low- and high-pressure regions on either side of the rotor tangential to the direction of the wind stream. Thus, a powered rotor can propel a ship in a wind stream by harnessing some of the energy of the wind stream and redirecting it to propelling the ship.

Flettner rotors have been deployed on ships before.

In 1926, having replaced the sails on a schooner by twin rotatable cylinders to exploit the Magnus effect, Anton Flettner sailed into maritime history by crossing the Atlantic in record time in the vessel, renamed the Baden-Baden. The rapid expansion in the use of diesel engines and the very low price of hydrocarbon fuel meant, however, that further significant commercial exploitation or development did not take place, at least not in the 20th Century. However, with the finally recognized need to reduce by an order of magnitude the rate of release of $CO_2$ to the atmosphere, the potential role of the Flettner rotor has been re-awakened. At least four ship-design companies are advocating the use of such rotors as a source of supplementary power on ocean-going cargo vessels, while others have advocated the use of a fleet of 1500 radio-controlled vessels driven by Flettner rotors with discs along their length as a vehicle for marine-cloud seeding to reduce net incoming solar radiation. At a less speculative level, Enercon brought into service in late 2010 the vessel, E-Ship 1, with four Flettner rotors, for shipping the company's wind turbines. Craft, T. J., Iacovides, H., Johnson, N. and Launder, B. E., 2012. Back to the future: Flettner-Thom rotors for maritime propulsion?, In *ICHMT DIGITAL LIBRARY ONLINE*. Begel House Inc.

Increasingly, the potential of Flettner rotors for propulsion of water crafts is being recognized. It should be noted that while water craft and shipping are used herein as an example to illustrate the usefulness of the present invention, it is not meant to be considered limiting, and any other suitable application for the present invention known to or conceivable to one of skill in the art is also considered to be incorporated with the present invention. The lift force (L) is a key measure of the propulsive performance of a Flettner rotor since the total propulsion force (P) generated by a rotor is equal to $$P = L \sin(\alpha) - D \cos(\alpha)$$

where $\alpha$ is the angle between the ship heading and the incoming wind and D is the drag force. The force of propulsion increases linearly with L and therefore a higher lift force allows the ship to achieve a faster speed. Alternative, a higher lift coefficient can allow the reduction in size of the Flettner rotor, making it easier to install and operate on a ship. Thus, any design change that can increase the lift force generated by a Flettner rotor, while keeping the drag force to a small value, will significantly improve the efficiency of a Flettner rotor system and render it more fuel efficient. Such improvement to the Flettner rotor could also be used to improve the performance of aircrafts, rotorcrafts and drones, as well as devices designed to harvest energy from flows.

| DEFINITION OF SYMBOLS USED IN THE DESCRIPTION OF THE INVENTION | |
|---|---|
| U | Wind speed in meters per second |
| $\alpha$ | Angle between incoming wind and watercraft heading in degrees. |
| R | Radius of Flettner rotor in meters. |
| $\omega$ | Rotational speed of Flettner rotor in radians per second. |
| $\theta$ | Angle between incoming wind and the center of suction port in degrees. |
| $\Delta\theta$ | Size of suction port in degrees. |
| V | Average suction flow velocity through suction port |
| $\Omega$ | Non-dimensional rotational velocity = $R\omega/U$ |
| $\gamma$ | Non-dimensional suction velocity = V/U |
| m | Non-dimensional volume flux through suction port = $(\pi/180) \Delta\theta \gamma/2R$ |
| L, D | Lift and drag force on Flettner rotor. |
| P | Propulsive force generated by the Flettner Rotor. |
| $C_L$ | Lift coefficient = $L/(\rho U^2 R)$ |
| $C_D$ | Drag coefficient = $D/(\rho U^2 R)$ |

FIGS. 1A and 1B illustrate starboard and top down views of a watercraft with a Flettner rotor installed on the watercraft, according to an embodiment of the present invention. FIGS. 1A and 1B illustrate two views of a watercraft 2 with a Flettner rotor 1 installed on the deck of the watercraft according to one embodiment. In other embodiments, multiple Flettner rotors might be installed on the watercraft. The total propulsion force (P) generated by a rotor is equal to $$P = L \sin(\alpha) - D \cos(\alpha)$$

where α is the angle between the ship heading and the incoming wind and L and D are the lift and drag forces generated by the Flettner rotor.

FIGS. 2A and 2B illustrate respectively a perspective view of a Flettner rotor, according to an embodiment of the present invention, and a sectional view of the vertical cylindrical elements of a Flettner rotor with localized suction thought a port with adjustable size and angle relative to the wind direction, according to an embodiment of the present invention. FIG. 2B illustrates a cross-sectional view of the Flettner rotor 1 of FIG. 2A. The structure consists of a circular outer shroud 3, which is porous. This shroud rotates with an angular velocity @ and also allows air to flow through its porous surface. Inside the shroud are two circular-arc inserts that fit inside each other. The inserts do not form a full circle. The outer insert 4 and the inner insert 5 can rotate past each other. By adjusting the rotation angle of the two inserts, a suction port 6 can be formed at any angle θ to the incoming wind and with any size Δθ. Air can only flow from the outside to the inside through this port.

Figure 4:
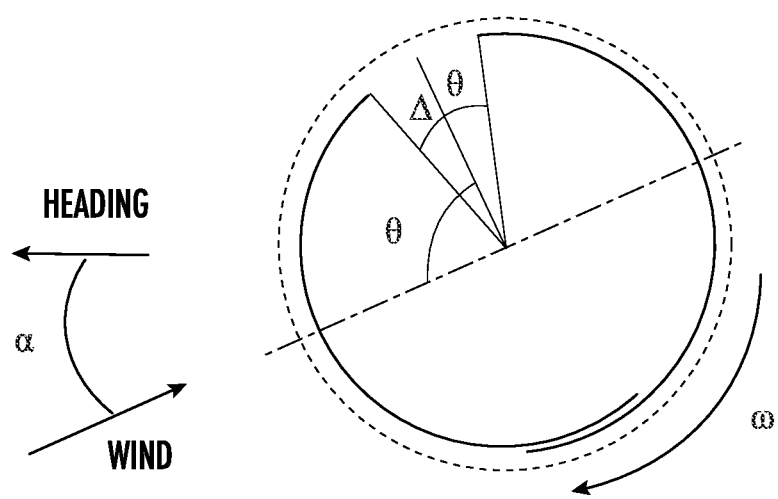
FIG. 4 illustrates a sectional view of the Flettner rotor of FIG. 2B with the suction port adjusted to a different angle relative to the wind direction, according to an embodiment of the present invention.
Figure 5:
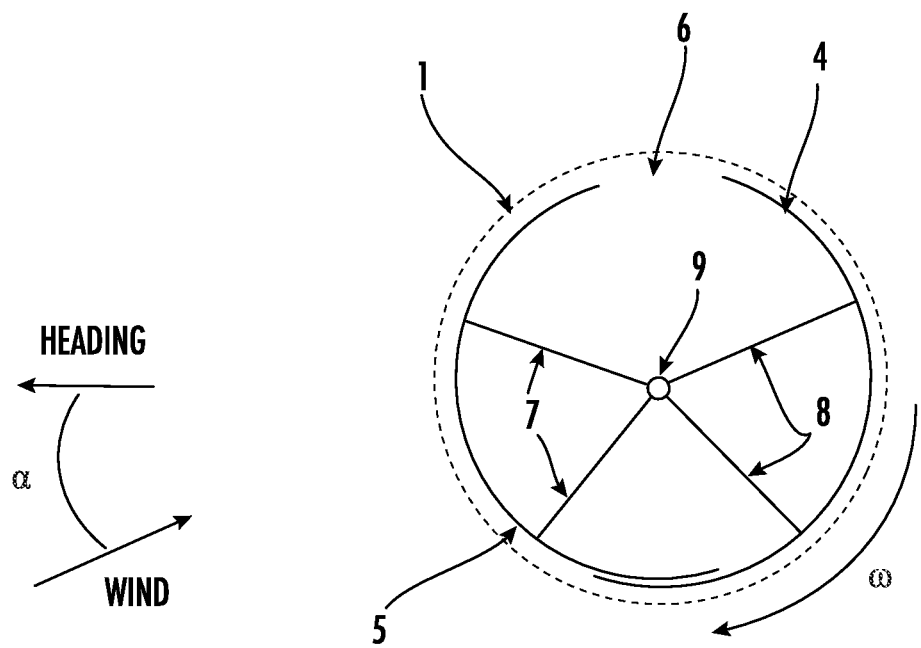
FIG. 5 illustrates a sectional view of the Flettner rotor in FIG. 2B with an embodiment of the internal support structure.

FIG. 3 illustrate a sectional view of the Flettner rotor of FIG. 2B and with a larger suction port, according to an embodiment of the present invention. FIG. 4 illustrates a sectional view of the Flettner rotor of FIG. 2B with the suction port adjusted to a different angle relative to the wind direction, according to an embodiment of the present invention. FIG. 5 illustrates a sectional view of the Flettner rotor in FIG. 2B with an embodiment of the internal support structure. FIG. 3 shows a port of a larger size than in FIG. 4, which shows a port of the same size as in FIG. 2B, but at a different angle. FIG. 5 shows an embodiment of the supports 7 and 8 for the inserts 5 and 4 respectively, and the axle 9 about which the two inserts rotate.

Figure 6:
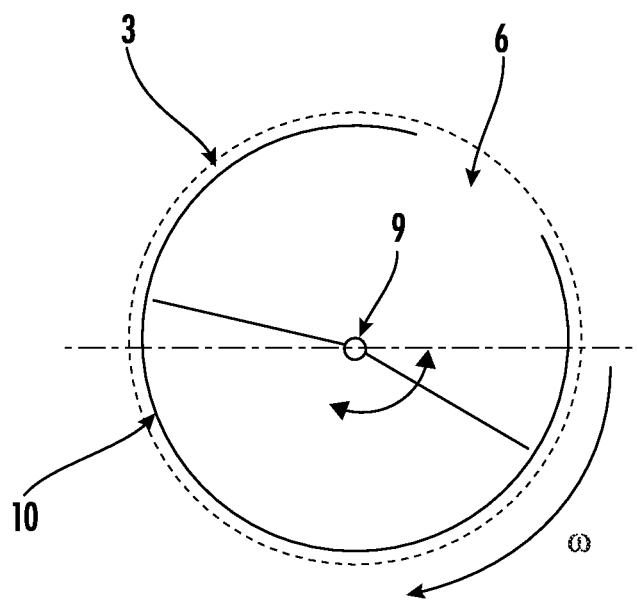
FIG. 6 illustrates a sectional view of a Flettner rotor with localized suction through a port of fixed width, according to an embodiment of the present invention.

FIG. 6 illustrates a sectional view of a Flettner rotor with localized suction through a port of fixed width, according to an embodiment of the present invention. FIG. 6 shows an embodiment of the cross-sectional view of the Flettner rotor with suction, with a single insert 10 with a port 6 that can rotate about the axle 9. This embodiment has fewer moving parts than the design in FIG. 2B but allows a single port 6 of a fixed size.

Figure 7:
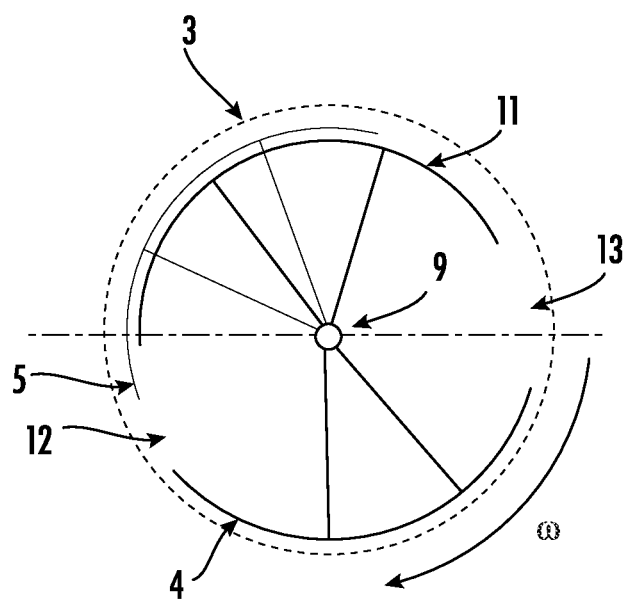
FIG. 7 illustrates a sectional view of a Flettner rotor with localized suction, with two ports with adjustable sizes and angles relative to the wind direction, according to an embodiment of the present invention.

FIG. 7 illustrates a sectional view of a Flettner rotor with localized suction, with two ports with adjustable sizes and angles relative to the wind direction, according to an embodiment of the present invention. FIG. 7 shows an embodiment of the cross-sectional view of the Flettner rotor with suction, with three inserts 4, 5 and 11 that can rotate about the axle 9. The three insert design of the embodiment can form two ports 12 and 13 at any angle and of any size.

Figure 8:
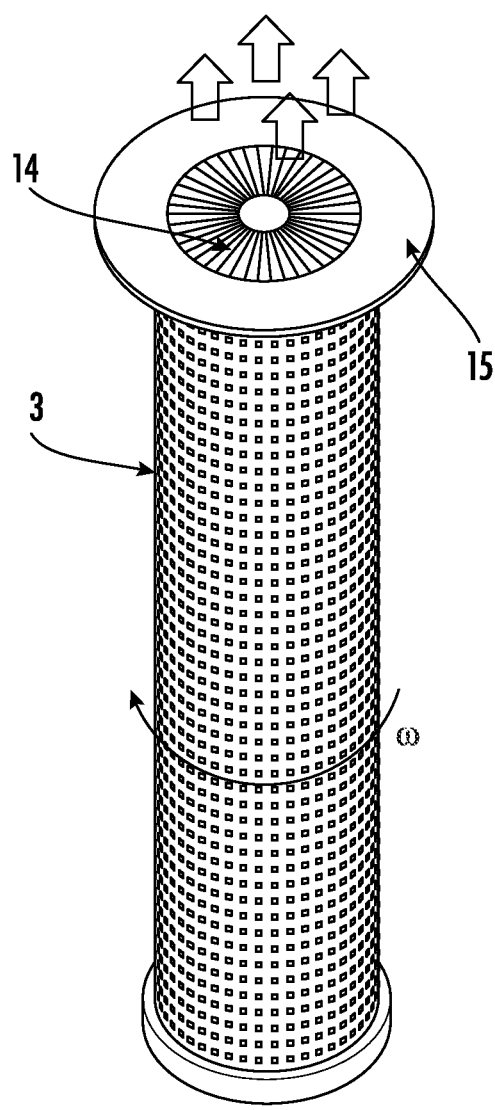
FIG. 8 illustrates a perspective view of a Flettner rotor with localized suction showing the porous outer rotating shroud with an array of holes and a vent fan on top of the rotor that exhaust the air sucked through rotor, according to an embodiment of the present invention.
Figure 9:
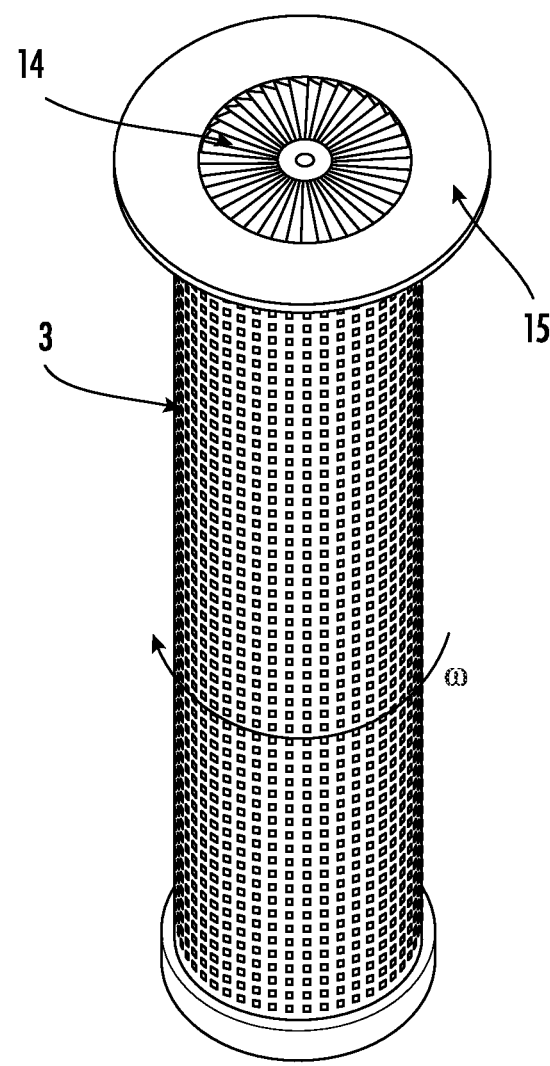
FIG. 9 illustrates another perspective view of an embodiment of the Flettner rotor with localized suction showing the porous outer rotating shroud with an array of holes and a vent fan on top of the rotor that exhaust the air sucked through rotor.

FIG. 8 illustrates a perspective view of a Flettner rotor with localized suction showing the porous outer rotating shroud with an array of holes and a vent fan on top of the rotor that exhaust the air sucked through rotor, according to an embodiment of the present invention. FIG. 9 illustrates another perspective view of an embodiment of the Flettner rotor with localized suction showing the porous outer rotating shroud with an array of holes and a vent fan on top of the rotor that exhaust the air sucked through rotor. FIGS. 8 and 9 shows an embodiment of the cross-sectional view of the Flettner rotor with suction with a cylindrical porous outer shroud 3 which can rotate at prescribed speeds using a motor or other drive. In this embodiment, a vent fan 14 is installed in the circular opening on top portion of the cylindrical outer shroud 3, which can pull air through the porous outer shroud and the slot 6 into the interior of the cylindrical volume and out through the top. Other means may be used to generate suction through the shroud including a vent fan at the bottom of the rotor. The rotor may include an end-plate 15 that has been shown to improve the propulsive performance of these rotors.

Figure 10:
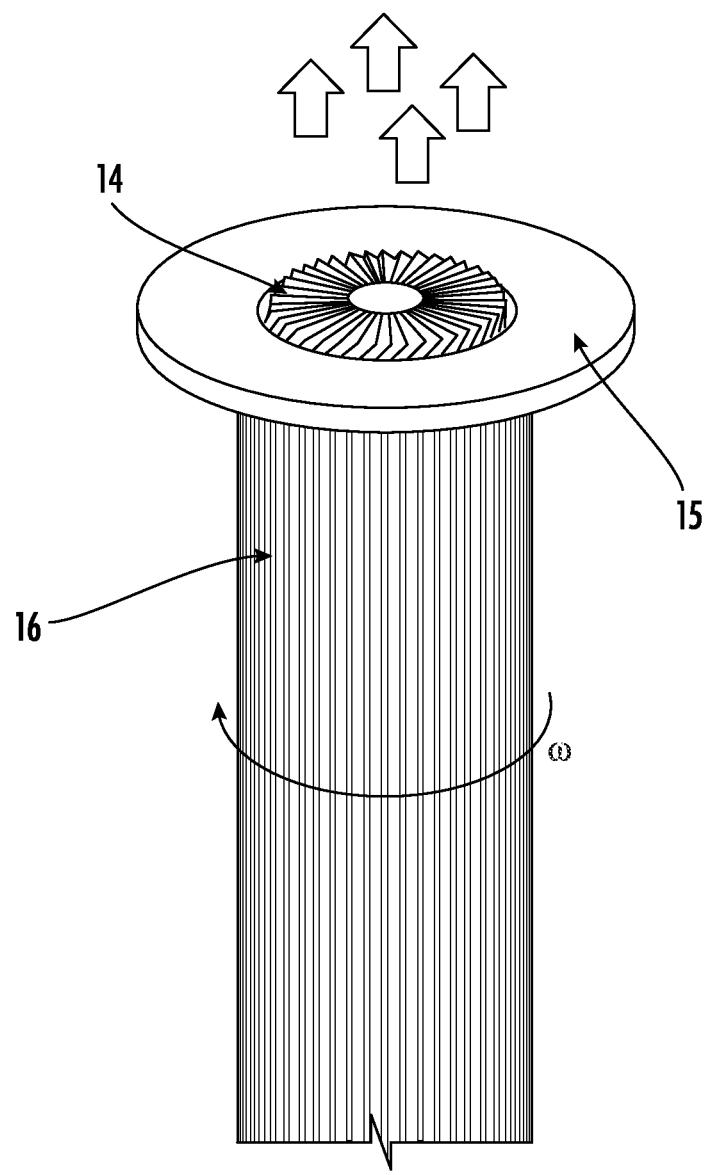
FIG. 10 illustrates a perspective view of a Flettner rotor with localized suction showing the porous outer rotating shroud with an array vertical slits and a vent fan on top of the rotor that exhaust the air sucked through rotor.

FIG. 10 illustrates a perspective view of a Flettner rotor with localized suction showing the porous outer rotating shroud with an array vertical slits and a vent fan on top of the rotor that exhaust the air sucked through rotor. FIG. 10 shows an embodiment of the Flettner rotor with a porous outer shroud where porosity is achieved through rows of vertical slits 16.

Figures 11A, 11B:
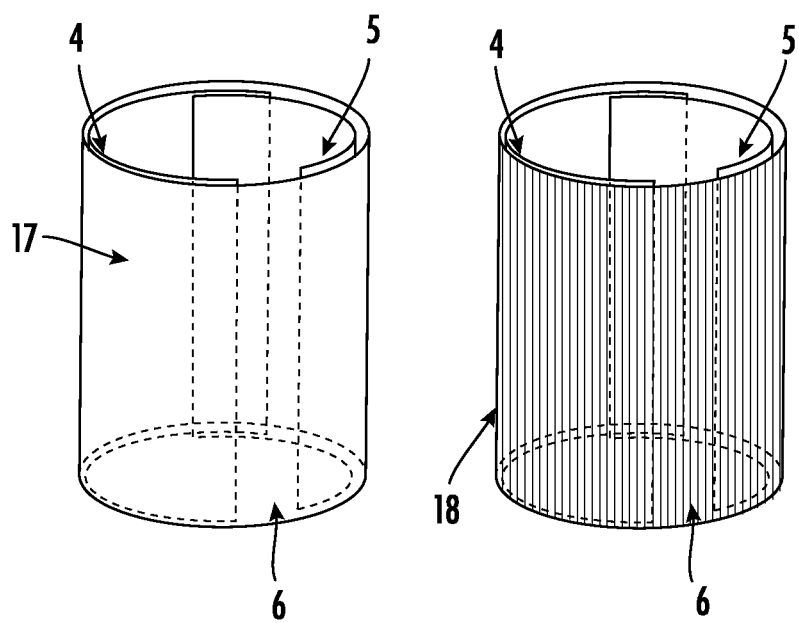
FIGS. 11A and 11B illustrate an embodiment of the cylindrical elements of the Flettner rotor with localized suction through the porous outer shroud with the left design showing an array of holes and the right design showing an array of slits, according to an embodiment of the present invention.

FIGS. 11A and 11B show two embodiments of the cylindrical elements of the Flettner rotor with localized suction; one with an array or holes 17 and one with rows of slits 18. Other arrangement and combinations of holes, slits and openings may be employed, as is known to or conceivable by one of skill in the art.

Figure 12:
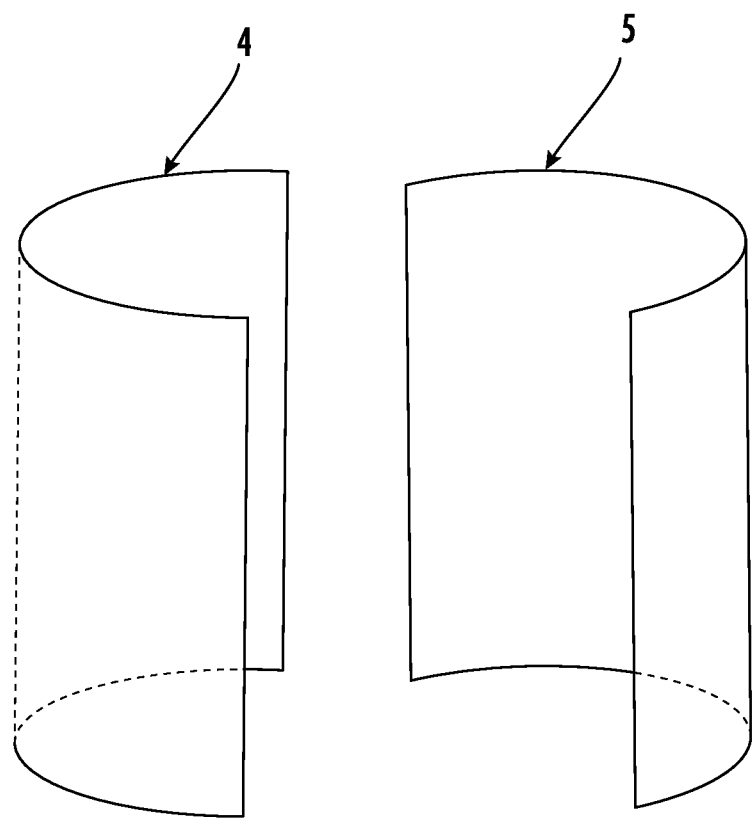
FIG. 12 illustrates two internal elements of the Flettner rotor which can be rotated to control the size and angular position of the suction port, according to an embodiment of the present invention.

FIG. 12 illustrates two internal elements of the Flettner rotor which can be rotated to control the size and angular position of the suction port, according to an embodiment of the present invention. FIG. 12 shows the inner inserts 4 and 5.

Figure 13C:
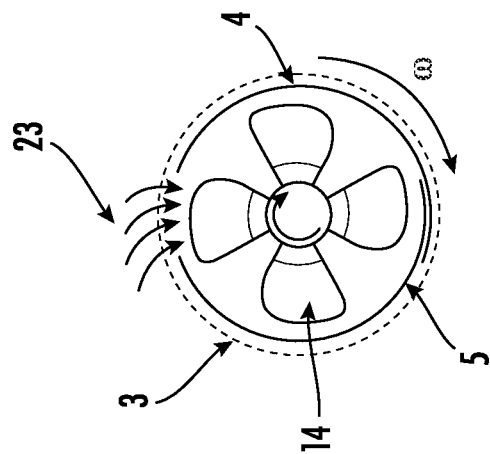
FIG. 13C illustrates a top-down view of the Flettner rotor with suction.
Figure 13B:
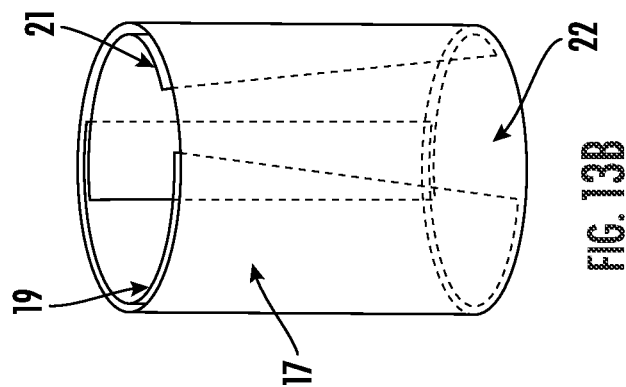
FIG. 13B illustrates an embodiment of the cylindrical elements of the Flettner rotor with localized suction through the porous outer shroud through a slot with non-uniform width from top to bottom.
Figure 13A:
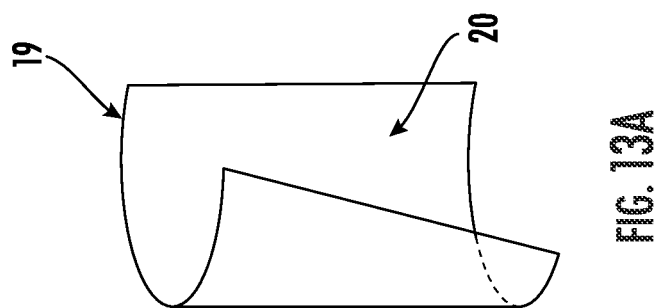
FIG. 13A illustrates an embodiment of the internal element of the Flettner rotor with a slot that increases in width from top to bottom.

FIG. 13A illustrates an embodiment of the internal element of the Flettner rotor with a slot that increases in width from top to bottom. FIG. 13B illustrates an embodiment of the cylindrical elements of the Flettner rotor with localized suction through the porous outer shroud through a slot with non-uniform width from top to bottom. FIG. 13C illustrates a top-down view of the Flettner rotor with suction. FIG. 13A shows an embodiment of an inner insert 19 with a non-uniform opening 20. The other insert can also have a non-uniform opening size. An opening that increases in size from top to bottom would allow for a more uniform flow through the opening. Other variations in the opening shape could be employed to modify the flow rate. FIG. 13B shows an embodiment of the cylindrical elements of the Flettner rotor with two inserts 19 and 21 with non-uniform opening sizes that generate an expanding slot 22 for suction though the outer porous shroud 17. FIG. 13C shows the top view of an embodiment of the Flettner rotor with localized suction which shows the outer porous shroud 3, the two inner inserts 4 and 5 that form the suction slot, the vent fan 14 mounted on the top of the cylindrical cavity formed by the components 3, 4 and 5. The vent fan generated an outward flow from the cylindrical cavity which results in the flow being sucked into the port as depicted by the arrows 23.

Figure 14C:
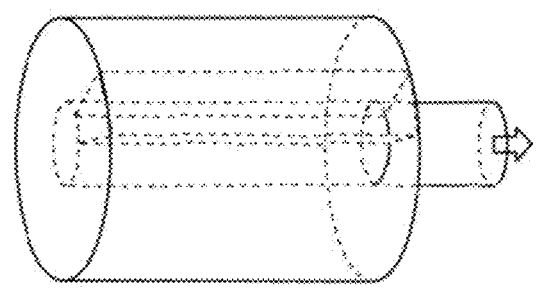
FIGS. 14A-14C illustrate views of an embodiment of the Flettner rotor with localized suction showing the porous outer rotating shroud with an array of holes and a reverse flow manifold connected to a suction port installed inside the rotor.
Figure 14B:
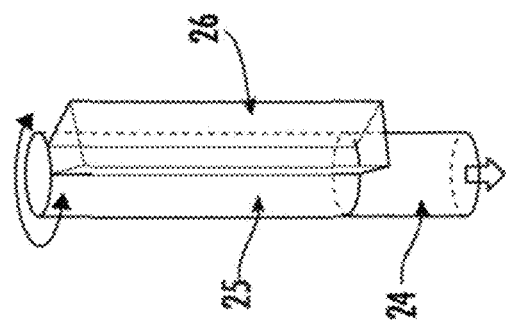
Figure 14A:
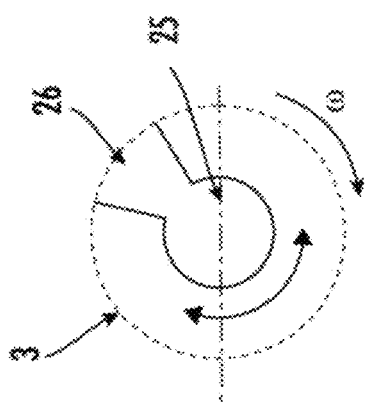

FIGS. 14A-14C illustrate views of an embodiment of the Flettner rotor with localized suction showing the porous outer rotating shroud with an array of holes and a reverse flow manifold connected to a suction port installed inside the rotor. FIG. 14A illustrates a top-down, sectional view of a Flettner rotor with localized suction implemented with an inverse flow manifold 25 through a port 26, according to an embodiment of the present invention. FIG. 14B is a perspective view of the inverse flow manifold 25 with the angular suction port 26 and a suction conduit 24, which is connected to a suction pump or other device. The entire manifold can be rotated to control the angular location of the section port 26 relative to the rest of the rotor. FIG. 14C shows a perspective view of the Flettner rotor with the inverse flow manifold installed inside. The outer shroud has a surface defining an interior space. The surface of the outer shroud is porous to allow fluid flow through the porous surface, and the shroud is configured to rotate with an angular velocity. An inverse flow manifold with an angular suction port of some angular extent that opens adjacent to the porous surface is inserted in the interior of the porous rotor surface. The manifold insert is configured to be rotated to any chosen orientation. The manifold is connected to a pump that generates suction flow through the port. The design of the embodiment illustrated in FIGS. 14A-14C is particularly well suited for applications such as drones and rotorcrafts.

Figure 15C:
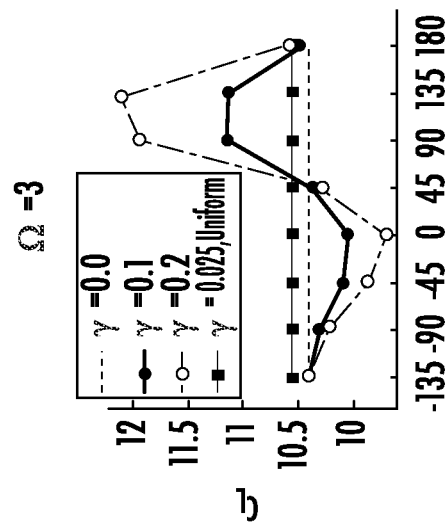
FIGS. 15A-15C illustrate graphical views of lift coefficient data from computational fluid dynamics (CFD) simulations of a Flettner rotor with localized suction for a range of rotational speeds (52), and suction velocities (γ).
Figure 15B:
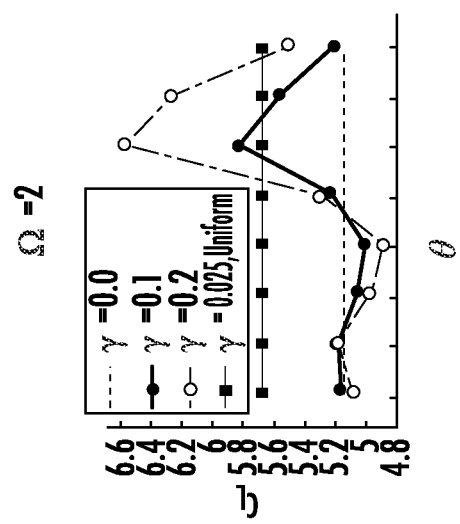
Figure 15A:
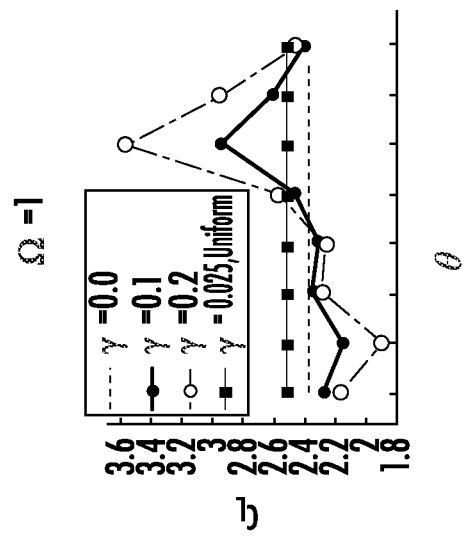

FIGS. 15A-15C illustrate graphical views of lift coefficient data from computational fluid dynamics (CFD) simulations of a Flettner rotor with localized suction for a range of rotational speeds ($\Omega$), and suction velocities ($\gamma$). FIGS. 15A-15C show data for cases with uniform suction over the entire surface of the Flettner rotor. The external flow is from left to right and the rotor is rotating in a clockwise direction. FIGS. 15A-15C show the lift coefficient data from computational fluid dynamics (CFD) simulations of a Flettner rotor with localized suction through a slot size of 45 degrees for a range of non-dimensional rotational speeds ($\Omega$), and suction velocities ($\gamma$). The figure also shows data for cases with uniform suction over the entire surface of the Flettner rotor at the same volume flux with the localized suction ($\gamma$=0.2). FIGS. 15A-15C show that lift can be increased significantly for this rotor by selecting a slot location that has an angle $\theta$ between 90 and 135 degrees. FIGS. 15A-15C also show that the lift increases with suction velocity and with rotational velocity. Table 1, below, summarizes the comparison of maximum lift coefficient at rotational velocities of $\Omega$=1, 2 and 3, the maximum lift with a suction velocity $\gamma$=0.2 is about 50%, 30% and 20% higher, respectively, than the corresponding value of the Flettner rotor without suction. Furthermore, for rotational velocities of $\Omega$=1, 2 and 3, the maximum lift with a suction volume flux m=0.157 is about 41%, 23% and 17% higher, respectively, than the corresponding value of the Flettner rotor with uniform suction.

TABLE 1

Maximum Lift Coefficient for Various Operational Conditions

| Rotational speed | $\gamma$ = 0.0 (no suction) | Localized suction; $\gamma$ = 0.1, m = 0.079 | Localized suction; $\gamma$ = 0.2, m = 0.157 | Localized suction; $\gamma$ = 0.5, m = 0.393 | Uniform Suction; $\gamma$ = 0.025, m = 0.157 |
|---|---|---|---|---|---|
| $\Omega$ = 1 | 2.27 | 2.94 | 3.57 | 5.23 | 2.51 |
| $\Omega$ = 2 | 5.1 | 5.83 | 6.62 | 8.84 | 5.37 |
| $\Omega$ = 3 | 10.4 | 11.35 | 12.52 | 14.54 | 10.72 |

Figure 16C:
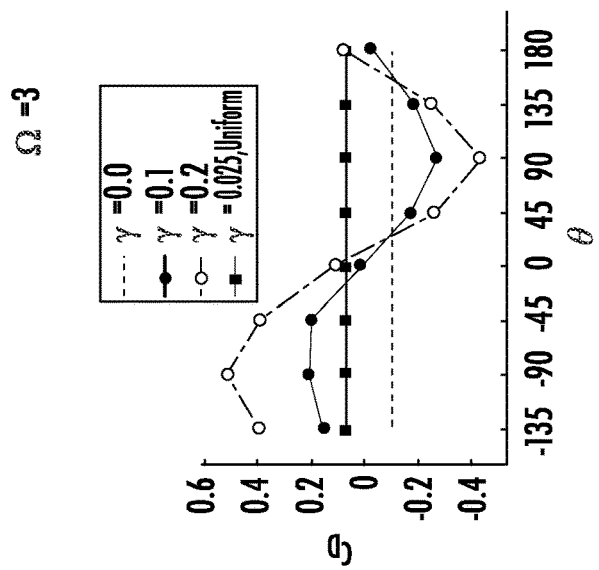
FIGS. 16A-16C illustrates graphical views of drag coefficient data from computational fluid dynamics (CFD) simulations of a Flettner rotor with localized suction for a range of rotational speeds (52), and suction velocities (γ). Figure also shows data for cases with uniform suction over the entire surface of the Flettner rotor. The external flow is from left to right and the rotor is rotating in a clockwise direction.
Figure 16B:
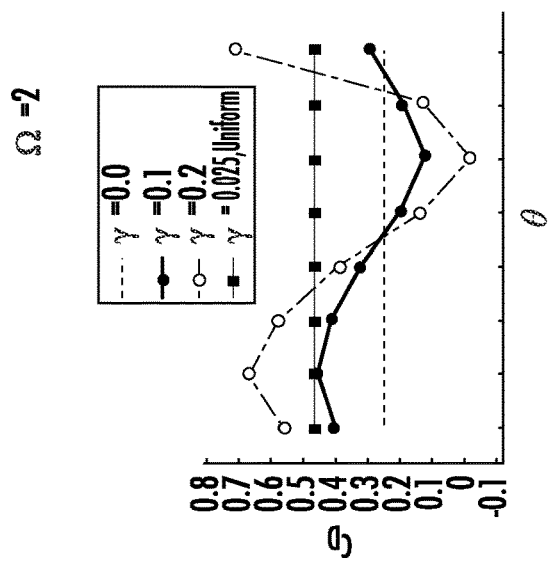
Figure 16A:
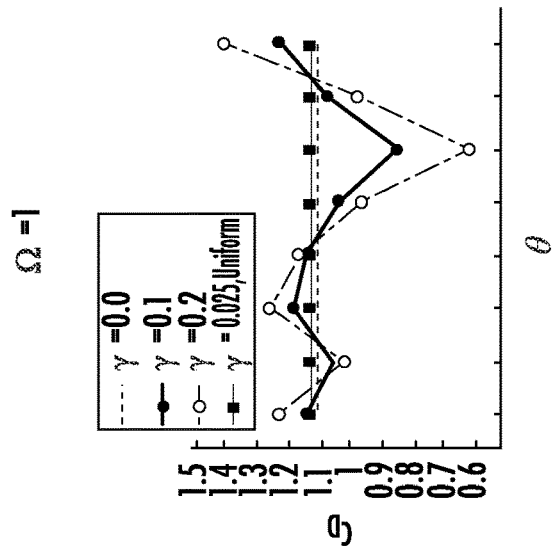

FIGS. 16A-16C illustrates graphical views of drag coefficient data from computational fluid dynamics (CFD) simulations of a Flettner rotor with localized suction for a range of rotational speeds ($\Omega$), and suction velocities ($\gamma$). Figure also shows data for cases with uniform suction over the entire surface of the Flettner rotor. The external flow is from left to right and the rotor is rotating in a clockwise direction. FIGS. 16A-16C show the drag coefficient data from computational fluid dynamics (CFD) simulations of a Flettner rotor with localized suction through a slot size of 45 degrees for a range of rotational speeds ($\Omega$), and suction velocities ($\gamma$). FIGS. 16A-16C also shows data for cases with uniform suction over the entire surface of the Flettner rotor. For angle $\theta$ between 90 and 135 degrees, the drag coefficient values are smaller than the corresponding values for no suction and uniform suction. In fact, the values for many of these cases are small negative values, something that has been observed in other studies. Small or negative drag values also improve the propulsive performance of a Flettner rotor since they increase the net propulsive force and allow the watercraft to head more directly into the wind if needed.

Figure 17:
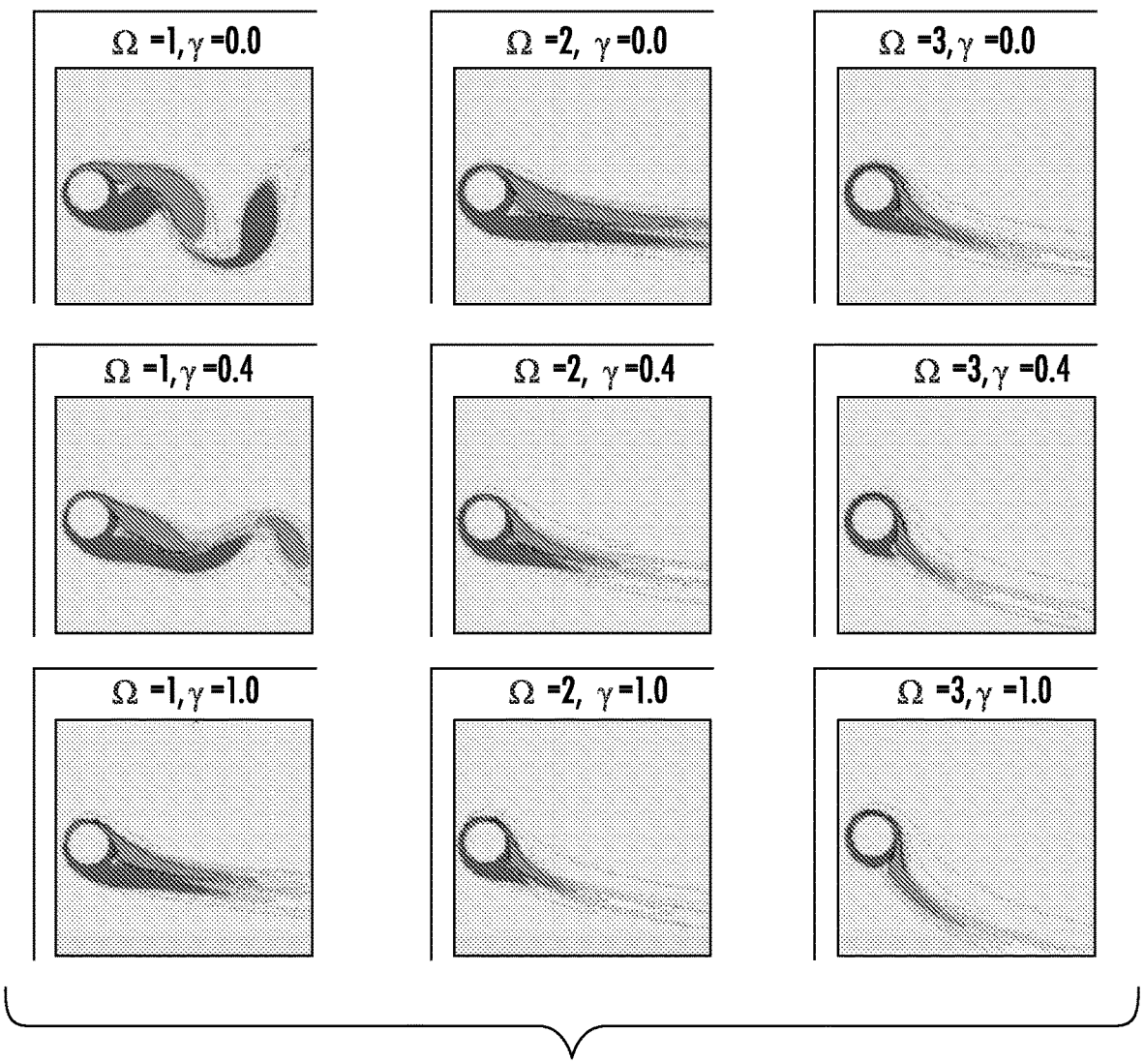
FIG. 17 illustrates graphical views of vorticity contours from computational fluid dynamics (CFD) simulations of a Flettner rotor with localized suction for a range of rotational speeds (52), and suction velocities (γ) for a suction port with a size of 45 degrees centered at an angle of 90 degrees from the incoming flow. The external flow is from left to right and the rotor is rotating in a clockwise direction.

FIG. 17 illustrates graphical views of vorticity contours from computational fluid dynamics (CFD) simulations of a Flettner rotor with localized suction for a range of rotational speeds ($\Omega$), and suction velocities ($\gamma$) for a suction port with a size of 45 degrees centered at an angle of 90 degrees from the incoming flow. The external flow is from left to right and the rotor is rotating in a clockwise direction. FIG. 17 shows vorticity contours from computational fluid dynamics (CFD) simulations of a Flettner rotor with localized suction for a range of rotational speeds ($\Omega$), and suction velocities ($\gamma$) for a suction port with a size of 45 degrees centered at an angle of 90 degrees from the incoming flow where high propulsive performance is observed. The external flow is from left to right and the rotor is rotating in a clockwise direction. The plot shows that localized suction has a significant impact on the boundary layer and wake of the Flettner rotor.

Figure 18:
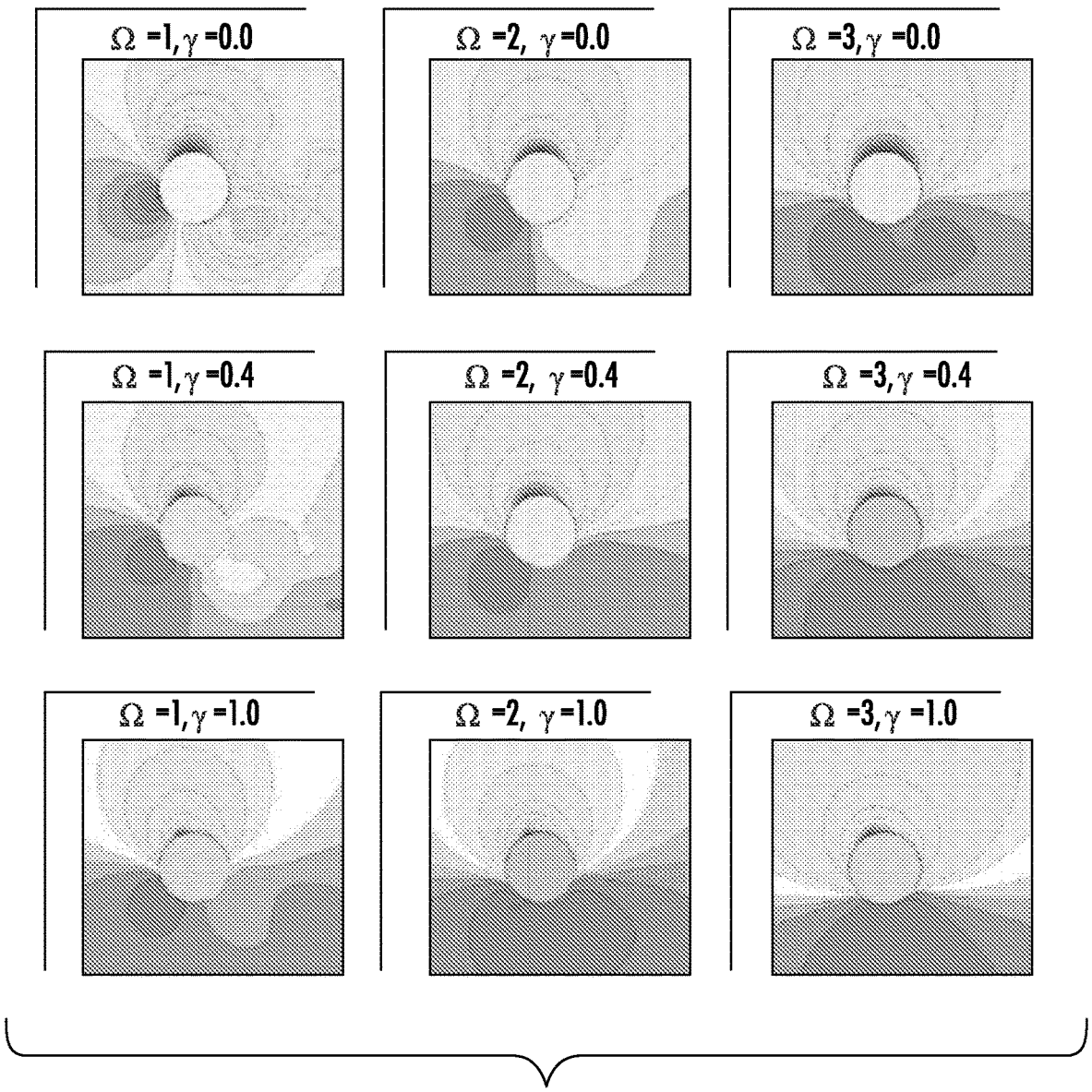
FIG. 18 illustrates graphical views of pressure contours from computational fluid dynamics (CFD) simulations of a Flettner rotor with localized suction for a range of rotational speeds (Ω), and suction velocities (γ) for a suction port with a size of 45 degrees centered at an angle of 90 degrees from the incoming flow. The external flow is from left to right and the rotor is rotating in a clockwise direction.

FIG. 18 illustrates graphical views of pressure contours from computational fluid dynamics (CFD) simulations of a Flettner rotor with localized suction for a range of rotational speeds ($\Omega$), and suction velocities ($\gamma$) for a suction port with a size of 45 degrees centered at an angle of 90 degrees from the incoming flow. The external flow is from left to right and the rotor is rotating in a clockwise direction. FIG. 18 shows pressure contours from computational fluid dynamics (CFD) simulations of a Flettner rotor with localized suction for a range of rotational speeds ($\Omega$), and suction velocities ($\gamma$) for a suction port with a size of 45 degrees centered at an angle of 90 degrees from the incoming flow where high propulsive performance is observed. The external flow is from left to right and the rotor is rotating in a clockwise direction. The plot shows that localized suction has a significant impact on the pressure over the cylinder and this has a direct impact on the lift and drag generated by the Flettner rotor.

Figure 19:
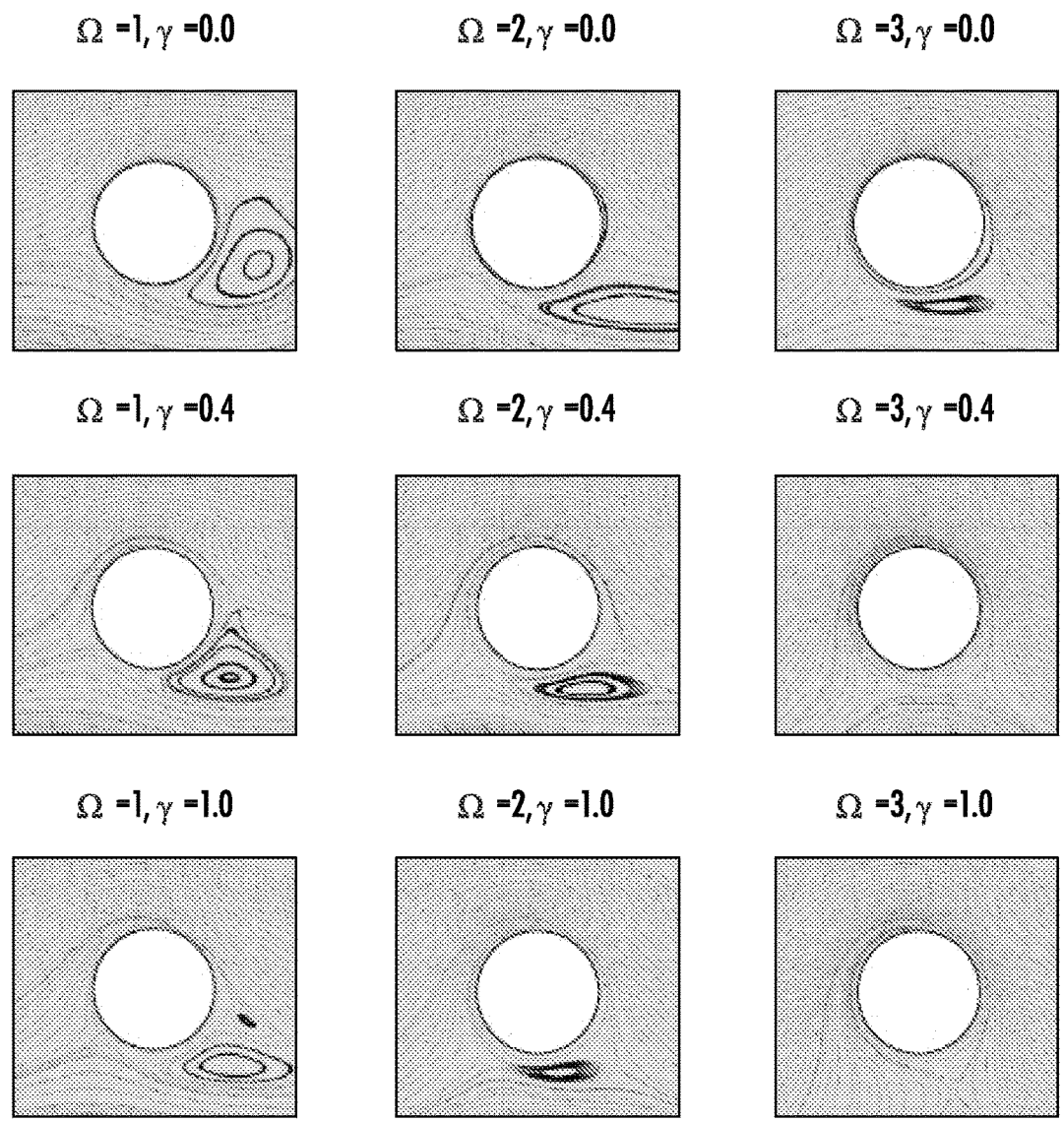
FIG. 19 illustrates graphical views of streamlines from computational fluid dynamics (CFD) simulations of a Flettner rotor with localized suction for a range of rotational speeds (Ω), and suction velocities (γ) for a suction port with a size of 45 degrees centered at an angle of 90 degrees from the incoming flow. The external flow is from left to right and the rotor is rotating in a clockwise direction.

FIG. 19 illustrates graphical views of streamlines from computational fluid dynamics (CFD) simulations of a Flettner rotor with localized suction for a range of rotational speeds ($\Omega$), and suction velocities ($\gamma$) for a suction port with a size of 45 degrees centered at an angle of 90 degrees from the incoming flow. The external flow is from left to right and the rotor is rotating in a clockwise direction. FIG. 18 shows streamlines from computational fluid dynamics (CFD) simulations of a Flettner rotor with localized suction for a range of rotational speeds ($\Omega$), and suction velocities ($\gamma$) for a suction port with a size of 45 degrees centered at an angle of 90 degrees from the incoming flow where high propulsive performance is observed. The external flow is from left to right and the rotor is rotating in a clockwise direction. The plot shows that localized suction has a significant impact the regions of flow separation over the rotor and this has direct impact on the pressure field and the lift and drag over the rotor.

Figure 20B:
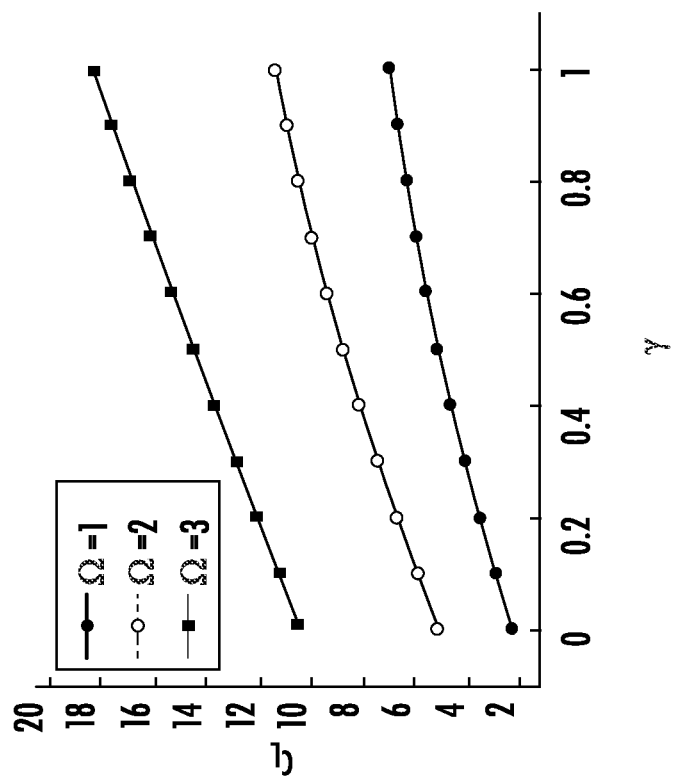
FIGS. 20A and 20B illustrate graphical views of lift and drag coefficient data from computational fluid dynamics (CFD) simulations of a Flettner rotor with localized suction for a range of rotational speeds (Ω), and suction velocities (γ) for a suction port with a size of 45 degrees centered at an angle of 90 degrees from the incoming flow. The external flow is from left to right and the rotor is rotating in a clockwise direction.
Figure 20A:
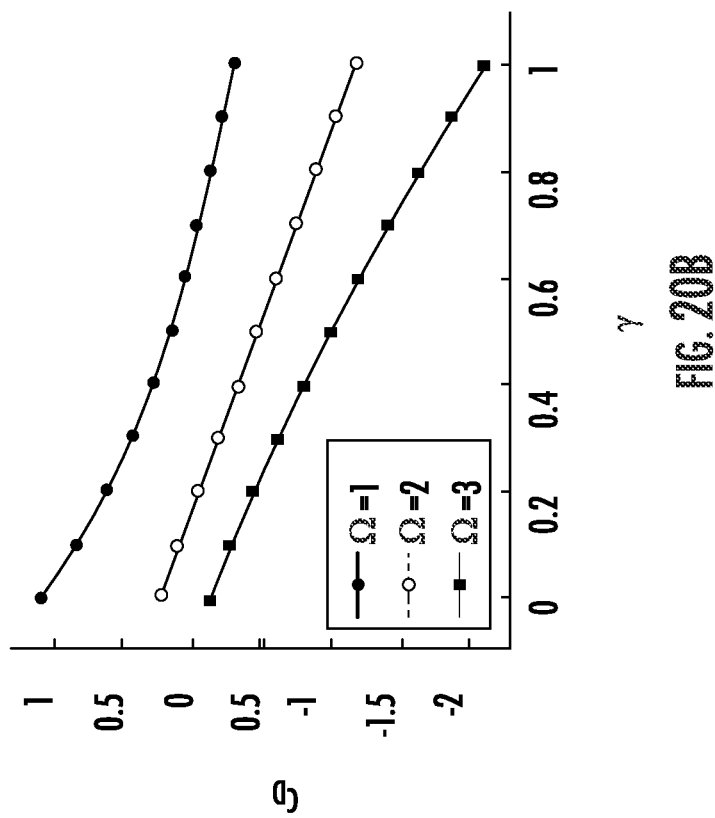

FIGS. 20A and 20B illustrate graphical views of lift and drag coefficient data from computational fluid dynamics (CFD) simulations of a Flettner rotor with localized suction for a range of rotational speeds ($\Omega$), and suction velocities ($\gamma$) for a suction port with a size of 45 degrees centered at an angle of 90 degrees from the incoming flow. The external flow is from left to right and the rotor is rotating in a clockwise direction. FIGS. 20A and 20B show the lift and drag coefficient over a large range of suction velocities ($\gamma$=0.0-1.0) and for rotational speeds of ($\Omega$=1, 2 and 3. The suction port for all these cases is centered at $\theta$=90 degrees. The lift coefficient increases monotonically, and the drag coefficient decreases monotonically with the suction velocity. At rotational velocities of Ω=1, 2 and 3, the maximum lift with the highest suction velocity γ=1.0 is about 183%, 116% and 73% higher, respectively, than the corresponding value of the Flettner rotor without suction. Thus, with high suction velocities, very large increases in lift are possible.

Figure 21B:
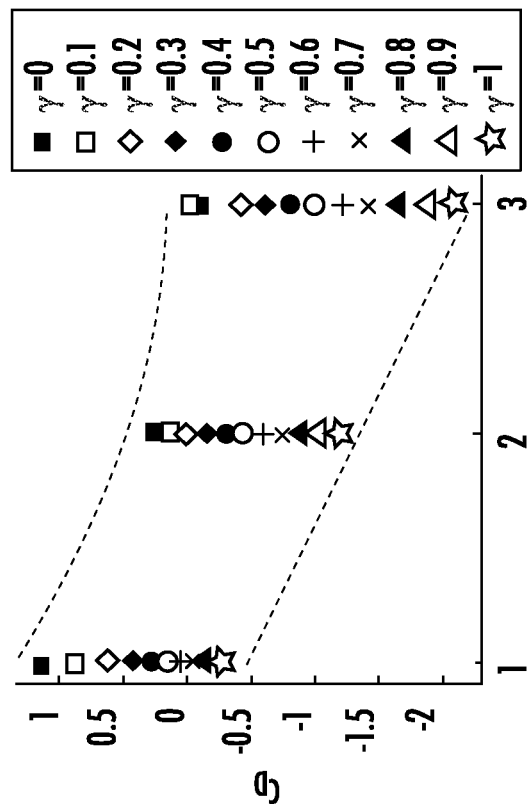
FIGS. 21A and 21B illustrate graphical views of lift and drag coefficient data from computational fluid dynamics (CFD) simulations of a Flettner rotor with localized suction for a range of rotational speeds (Ω), and suction velocities (γ) for a suction port with a size of 45 degrees centered at an angle of 90 degrees from the incoming flow. The external flow is from left to right and the rotor is rotating in a clockwise direction.
Figure 21A:
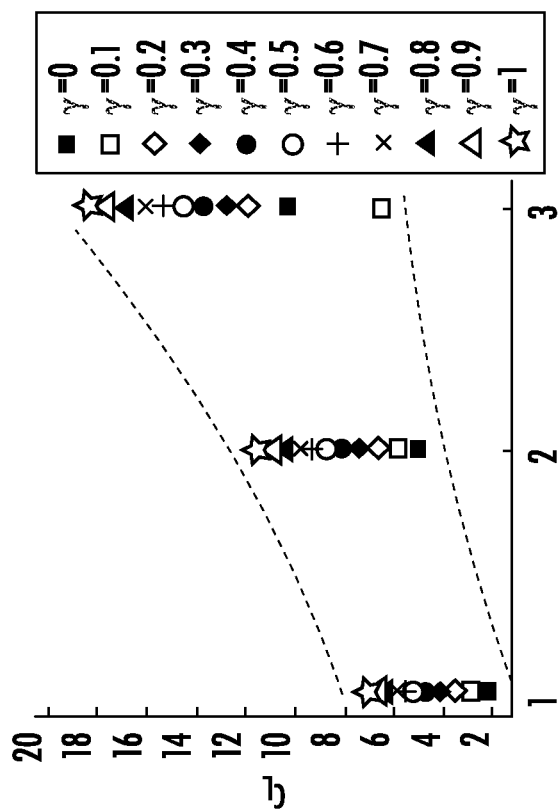

FIGS. 21A and 21B illustrate graphical views of lift and drag coefficient data from computational fluid dynamics (CFD) simulations of a Flettner rotor with localized suction for a range of rotational speeds (Ω), and suction velocities (γ) for a suction port with a size of 45 degrees centered at an angle of 90 degrees from the incoming flow. The external flow is from left to right and the rotor is rotating in a clockwise direction. FIGS. 20A and 20B show the lift and drag coefficient plotted against rotational speed Ω over a large range of suction velocities (γ=0.0-1.0). The suction port for all these cases is centered at θ=90 degrees. The lift coefficient increases monotonically, and the drag coefficient decreases monotonically with the rotational speed for each value of suction velocity.

Figure 22B:
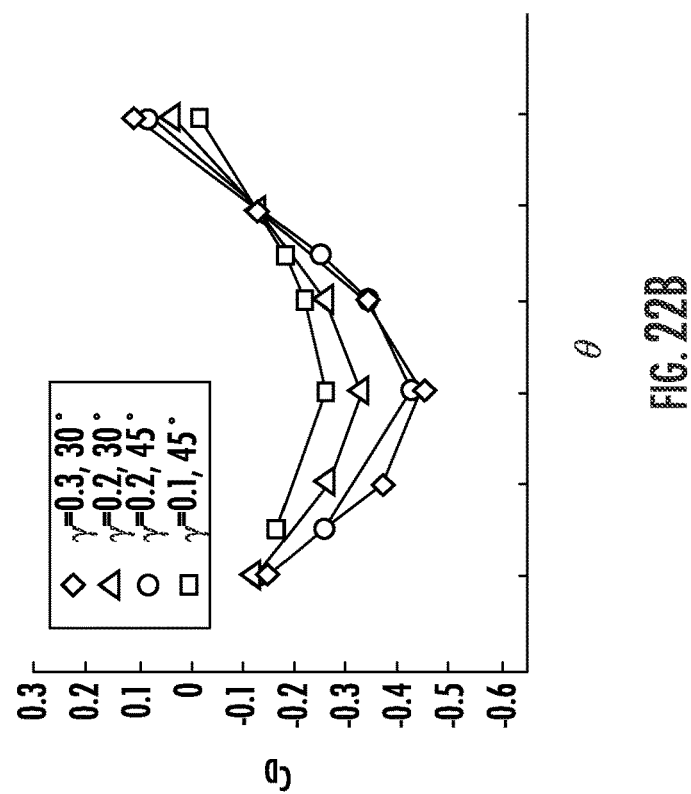
Figure 22A:
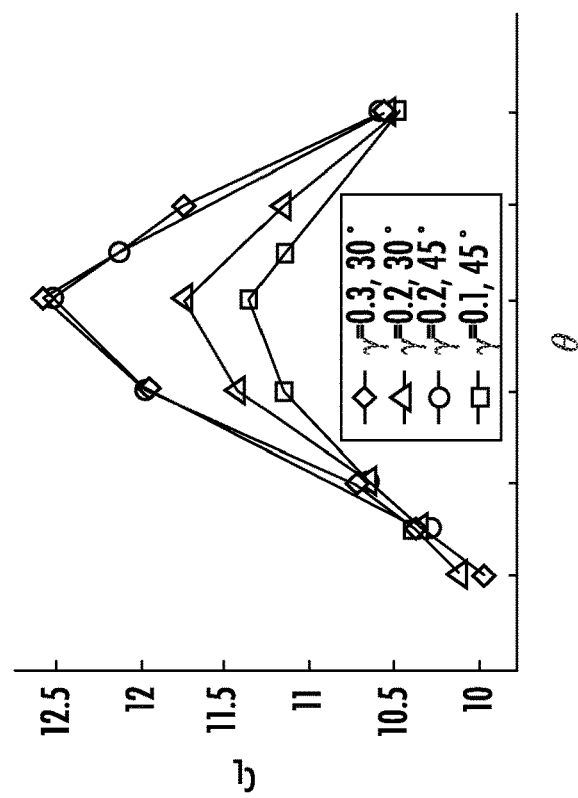

FIGS. 22A and 22B illustrate graphical views of lift and drag coefficient data from computational fluid dynamics (CFD) simulations of a Flettner rotor (52=3) with localized suction for a range of rotational speeds (Ω) and suction velocities (γ) for suction ports with sizes of 45 degrees and 30 degrees. The external flow is from left to right and the rotor is rotating in a clockwise direction. FIGS. 21A and 21B demonstrate the effect of port size of rotor performance. In particular, the figure shows lift and drag coefficient data from computational fluid dynamics (CFD) simulations of a Flettner rotor ((2=3) with localized suction for a range suction velocities (γ) for suction ports with sizes of 45 degrees and 30 degrees. The external flow is from left to right and the rotor is rotating in a clockwise direction. It is noted that the cases with Δθ=45 degrees: γ=0.2 and Δθ=30 degrees: γ=0.3 have the same volume flux m=0.157 and the lift and drag coefficients for these two cases are nearly the same over the entire range of port locations investigated here. This indicates that suction volume flux and suction port location are the key parameters for enhancing the performance of the Flettner rotor with localized suction.

Figure 23A:
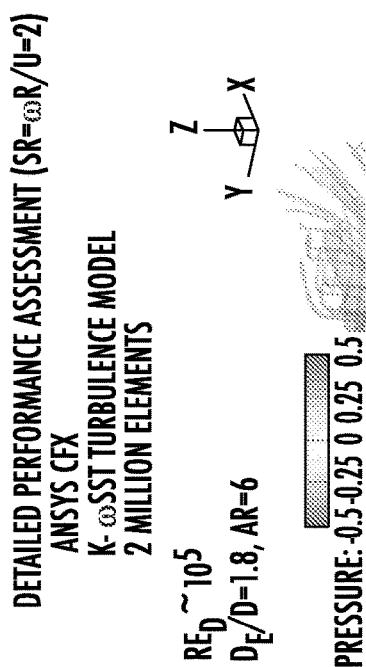
FIGS. 23A-23C illustrate schematic and graphical views of a detailed performance assessment based on computational fluid dynamic modeling of a 3D models of a conventional Flettner rotor, according to an embodiment of the present invention.
Figure 23B:
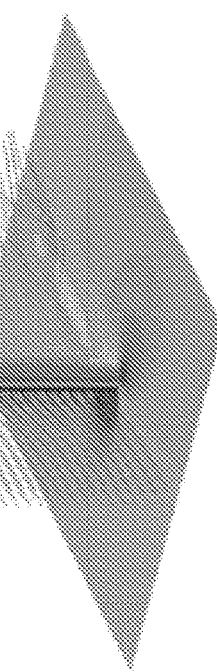
Figure 23C:
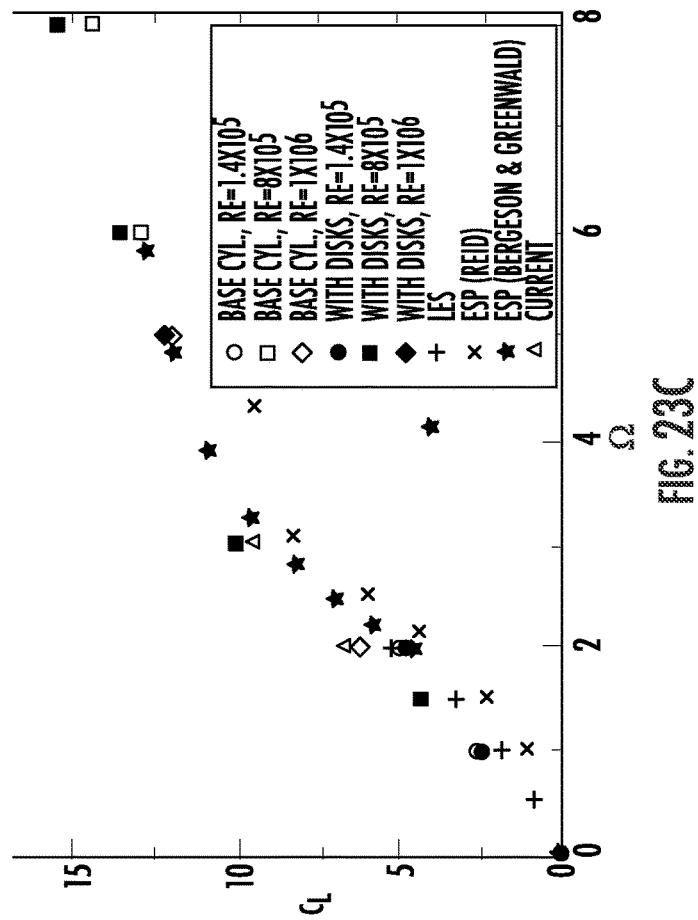

FIGS. 23A-23C illustrate schematic and graphical views of a detailed performance assessment of a conventional Flettner rotor (no suction), according to an embodiment of the present invention. FIG. 23A illustrates a three-dimensional simulation of a Flettner rotor, according to an embodiment of the present invention. This simulation is done with the following conditions, which mimic a typical condition for the operation on a ship.

$$SR=\omega R/U=2; Re_d \sim 10^5; d_s/d=1.8, \text{ and } AR=6$$

This exemplary set of conditions is not meant to be considered limiting and are simply included by way of example. A rotor according to the present invention can be operated in any way under any conditions known to or conceivable to one of skill in the art. FIGS. 23A-23C shows that the three-dimensional computational fluid dynamic simulations of the conventional Flettner rotor generate results that match established experiments.

Figure 24A:
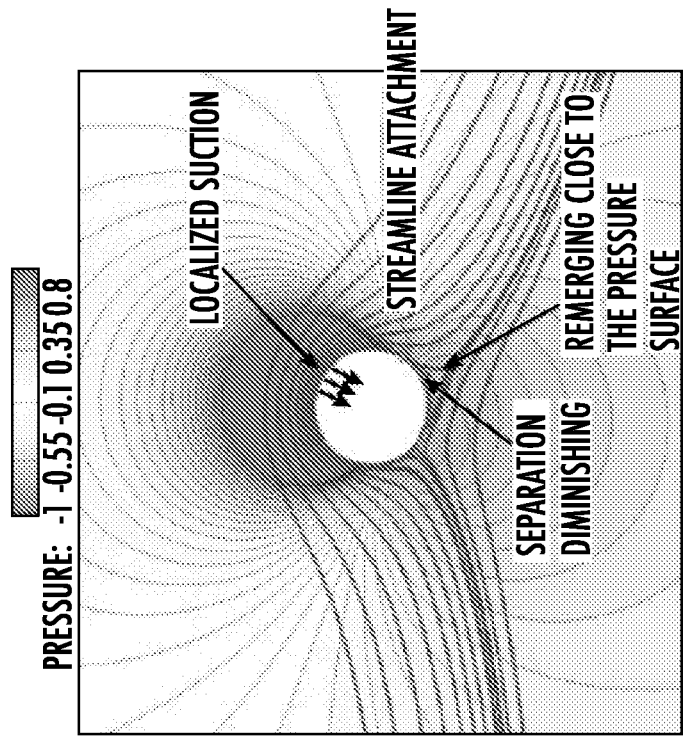
FIG. 24A and FIG. 24B illustrate views of the effect of suction on flow for the experimental conditions presented with respect to FIGS. 23A-23C.
Figure 24B:
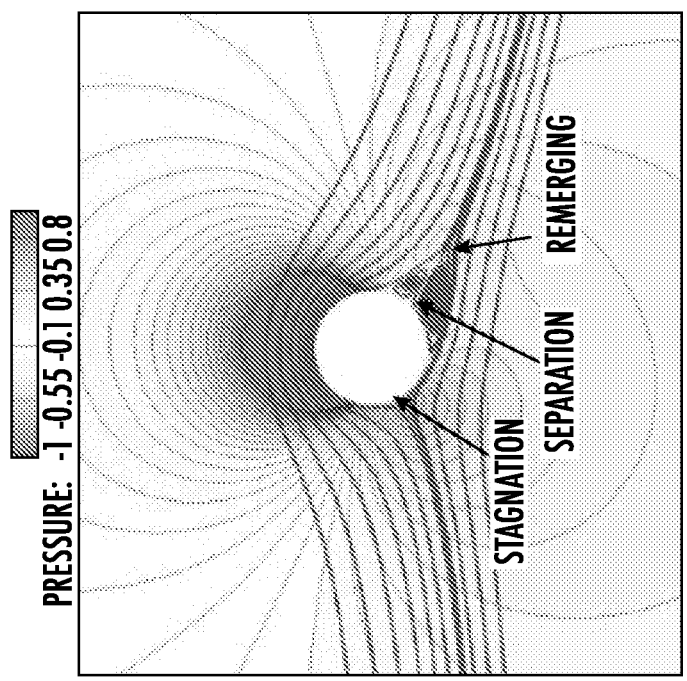
Figure 25A:
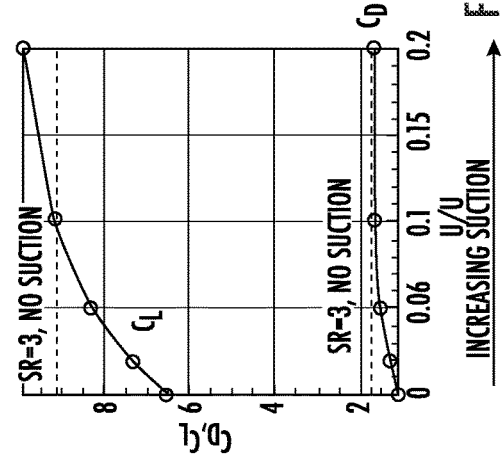
FIGS. 25A-25D illustrate data and graphical views of thrust enhancement achieved with a Flettner rotor, according to the present invention.
Figure 25C:
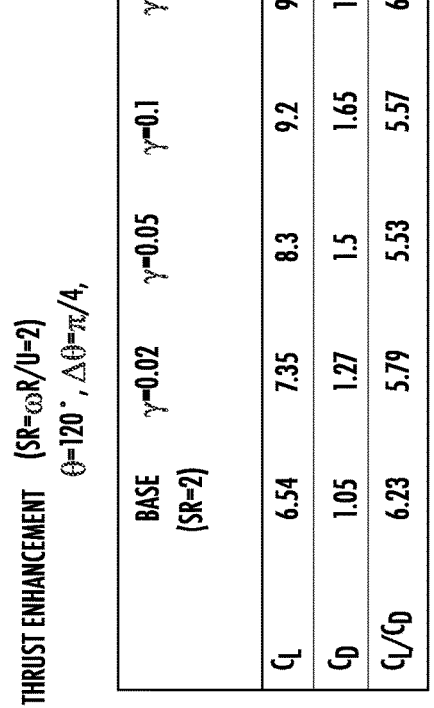
Figure 25D:
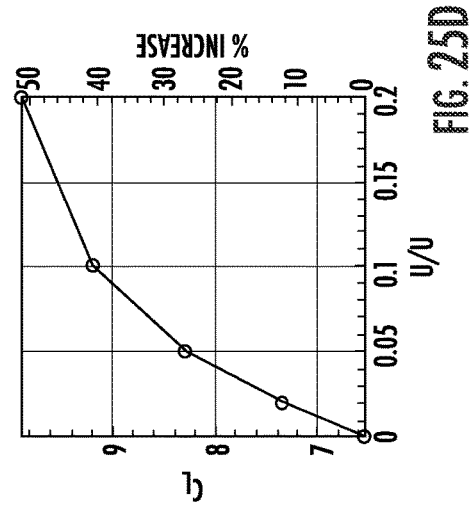
Figure 25B:
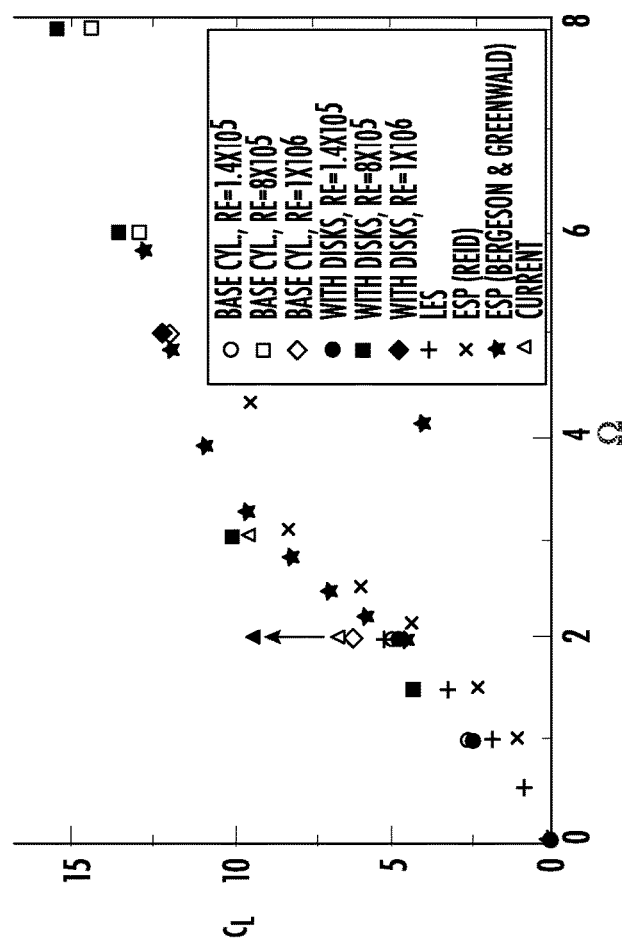

FIG. 24A and FIG. 24B illustrate views of the effect of suction on flow for the experimental conditions presented with respect to FIGS. 23A-23C. As noted with respect to FIGS. 23A-23C, the experimental conditions applied in the modeling mimic typical conditions for operation of a ship. The exemplary conditions are not meant to be considered limiting and are included simply by way of example. As illustrated in FIG. 24A, when there is no suction applied with the rotor, there is a significant region of flow separation on the lee-side of the rotor and this results in reduced lift. In contrast, when suction is applied, as illustrated in FIG. 24B, the flow separation is significantly diminished and streamlined flow reemerges close to the pressure surface. With respect to FIG. 24B, an exemplary suction of γ=0.1 is applied in a localized manner.

FIGS. 25A-25D illustrate data and graphical views of thrust enhancement achieved with a Flettner rotor, according to the present invention. As noted with respect to FIGS. 23A-23C, the experimental conditions applied in the modeling mimic typical conditions for operation of a ship. The exemplary conditions are not meant to be considered limiting and are included simply by way of example. Additional exemplary conditions are detailed in the data and graphs of FIGS. 25A-25D. FIGS. 25A-25D show that lift is enhanced with suction. The data from these simulations also shows that lift is enhanced at different spin ratios (SRs), with suction.

Figure 26:
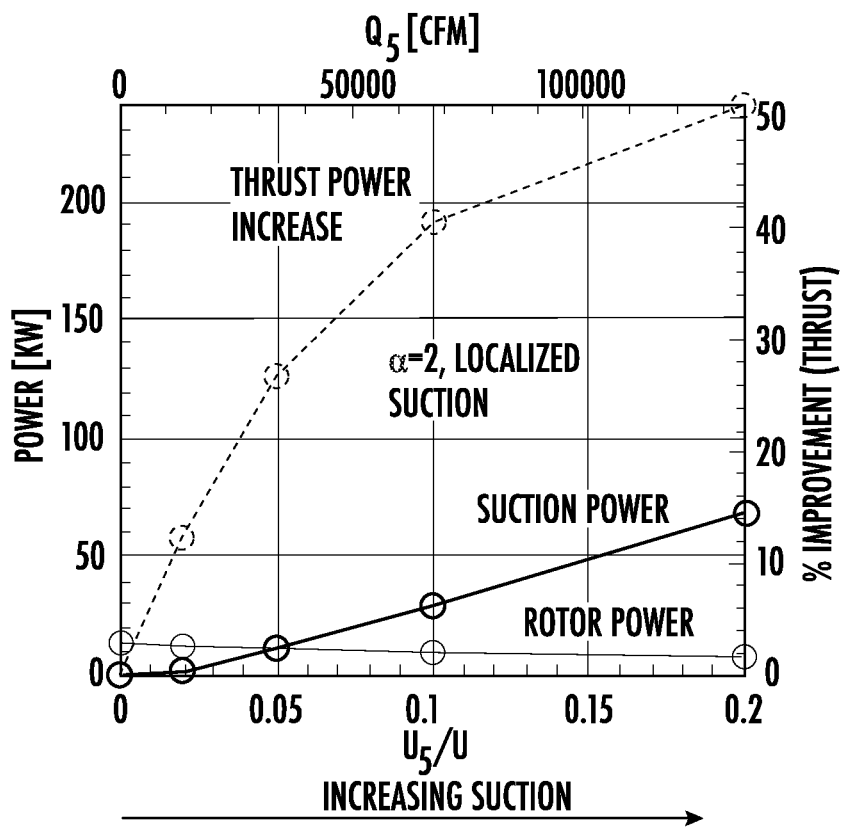
FIG. 26 illustrates a graphical view of energetics for a simulation using a Flettner rotor according to an embodiment of the present invention.

FIG. 26 illustrates a graphical view of energetics obtained from the three-dimensional simulation using a Flettner rotor according to an embodiment of the present invention. FIG. 26 shows graphical data for the following conditions:

$$D=3 \text{ m}: L=18 \text{ m}: U_\infty=15 \text{ m/s (29 knots)}: V=20 \text{ knots}: \omega=190 \text{ RPM at } \alpha=2$$

These conditions are included by way of example and are not meant to be considered limiting. As is illustrated in FIG. 26, the Flettner rotor of the present invention and the suction generated, produces increased propulsion and also does so in a powerefficient manner. Suction requires power, but the power required for suction is less than the overall gain in thrust power. FIG. 26 therefore shows that there is a net total savings in power despite the power required to implement the suction.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

The invention claimed is:

1. A device for propulsion comprising:
   an outer shroud having a surface defining an interior space, wherein the surface of the outer shroud is porous to allow fluid flow through the surface, and wherein the outer shroud is configured to rotate with an angular velocity;
   a circular-arc insert disposed within the interior space of the outer shroud, wherein the circular-arc insert is configured to rotate to any fixed position; and,
   a suction port formed by adjusting a space formed by the circular-arc insert.

2. The device of claim 1 further comprising a second circular arc insert, wherein the circular arc insert and the second circular arc insert are configured to fit inside one another and rotate past one another.

3. The device of claim 2 wherein the circular arc insert and the second circular arc insert do not form a complete circle, and the suction port is formed by adjusting a space between the two circular-arc inserts.

4. The device of claim 1 further comprising N circular-arc inserts and wherein the circular arc insert and the N circular-arc inserts are configured to fit inside one another and rotate past one another.

5. The device of claim 4 wherein the circular arc insert and the N circular-arc inserts do not form a complete circle, and form N suction ports by adjusting a space between the N circular-arc inserts.

6. The device of claim 5 wherein the N suction ports are changeable in size and in angle.

7. The device of claim 1, wherein the suction port is formed at any angle $\theta$ to an incoming flow.

8. The device of claim 7, wherein the suction port is formed at any size $\Delta\theta$.

9. The device of claim 1 wherein the fluid flow though the shroud is limited through the suction port.

10. The device of claim 1 further comprising a source of suction.

11. The device of claim 1 further comprising the suction port being directed to a different angle relative to a direction of external fluid flow.

12. The device of claim 1 wherein the device is configured for placement on a ship.

13. The device of claim 12 wherein the device is configured to use suction to provide lift to the ship.

14. A device for propulsion comprising:
  an outer shroud having a surface defining an interior space, wherein the surface of the outer shroud is porous to allow fluid flow through the surface, and wherein the shroud is configured to rotate with an angular velocity;
  an inverse flow manifold disposed within the interior space of the outer shroud, wherein the insert is configured to rotate to any fixed position; and,
  a suction port wherein a location of the suction port is determined by rotation of the inverse flow manifold.

15. The device of claim 14 wherein the inverse flow manifold is configured to be rotated to any predetermined orientation.

16. The device of claim 15, wherein the suction port is formed at any size 40.

17. The device of claim 14 wherein the fluid flow though the outer shroud is limited through the suction port.

18. The device of claim 14 further comprising a source of suction.

19. The device of claim 14 further comprising the suction port being directed to a different angle relative to a direction of external fluid flow.

20. The device of claim 14 wherein the device for propulsion is configured for placement on a ship.

* * * * *